United States Patent [19]

Rooney

[11] 4,449,347

[45] May 22, 1984

[54] SOLAR COLLECTOR BUILDING TRUSS

[76] Inventor: Floyd H. Rooney, 3124 Bunker Lake Rd., Anoka, Minn. 55303

[21] Appl. No.: 207,299

[22] Filed: Nov. 17, 1980

Related U.S. Application Data

[62] Division of Ser. No. 907,788, May 17, 1978, Pat. No. 4,237,869.

[51] Int. Cl.³ .............................................. C04B 7/02
[52] U.S. Cl. ........................................ 52/639; 52/90; 52/173 R; 126/417
[58] Field of Search ..................... 52/90, 92, 93, 639, 52/18, 173 R, 690; 126/450, 438; 126/427–431, 417

[56] References Cited

U.S. PATENT DOCUMENTS

| | | | |
|---|---|---|---|
| 1,303,253 | 5/1919 | Buckwalter | 52/18 |
| 1,347,669 | 7/1920 | Ballinger | 52/18 |
| 1,466,174 | 8/1923 | Korn | 52/18 |
| 1,738,854 | 12/1929 | Thies | 52/18 |
| 3,464,167 | 9/1969 | Mason | 52/90 |
| 3,841,302 | 10/1974 | Falbel | 126/438 |
| 3,862,533 | 1/1975 | Fuss | 52/643 |
| 4,051,999 | 10/1977 | Granger | 126/431 |
| 4,103,825 | 8/1978 | Zornig | 126/449 |

FOREIGN PATENT DOCUMENTS

| | | | |
|---|---|---|---|
| 522239 | 9/1921 | France | 52/18 |
| 2267531 | 11/1975 | France | 126/429 |
| 585332 | 11/1958 | Italy | 52/93 |

OTHER PUBLICATIONS

Anderson, B., "Solar Energy: Fundamentals in Building Design," *McGraw-Hill*, New York, 1977, pp. 110–115 and pp. 211–214.

*Primary Examiner*—Henry E. Raduazo
*Attorney, Agent, or Firm*—Henry C. Kovar

[57] ABSTRACT

A solar heat collector building truss is an integral internal part of the structure of a building and has base beams, sunward beams extending up from and over the base beams, rear beams extending down from the sunward beams to the base beams and forming an equilateral triangle, and central beams truncating an apex between the rear and base beams; a solar collector with this truss has reflective surfaces mounted on the base, rear, and central beams, a solar window on the sunward beams, and a heat collector mounted perpendicular to the window and within the rear, base and central beams.

8 Claims, 8 Drawing Figures

SOLAR COLLECTOR BUILDING TRUSS

RELATED APPLICATIONS

This application is a co-pending divisional application of my U.S. Ser. 907,788 filed on May 17, 1978, now U.S. Pat. No. 4,237,869 of Dec. 9, 1980

BACKGROUND OF THE INVENTION

1. Field of the Invention

This invention pertains to a solar heat collector building truss for fabrication of the solar collector atop of a building.

2. The Prior Art

Solar heat collectors are being presented to consumers as an add on device to be fastened atop of a conventional roof structure. The purchaser has to incur the cost of a conventional roof and then mount the solar collector. These roof mounted collectors are exposed to ambiant temperature and must be well insulated, weather resistant and cleanable.

Integral construction of solar collectors as a part of a building is extremely expensive when done by present standards.

The most relevent known prior structures are documented in a book titled "SOLAR ENERGY: Fundamentals in Building Design" by Bruce Anderson, and published by McGraw Hill Book Company. On pages 211—213 an internal solar collector which is an integral part of a house and which was provided by Wormser Scientific Corporation is documented.

On page 114 an internal "water bed" house is documented.

These prior structures and add on collectors are for the most part characterized by unusual appearance, complication and excessive cost. These structures also have required costly and unique construction practices.

OBJECTS OF THE PRESENT INVENTION

It is an object of the present invention to provide a solar collector of a construction compatable with existing building construction techniques.

It is an object of the present invention to provide a solar collector of modest cost.

It is an object of the present invention to provide a relatively large solar collector which has an appearance complimental to past and present architectural practice.

It is an object of the present invention to provide a building truss for construction of a solar collector.

Many other advantages, features and additional objects of the present invention will become apparent to those versed in the art upon making reference to the enabling detailed description and accompanying drawings in which the preferred embodiment incorporating the principles of the present invention is set forth and shown by way of illustrative example.

SUMMARY OF THE INVENTION

A solar heat collector has base beams, sunward beams, rear beams, a solar window on the sunward beams and a heat absorber within the beams, the collector is an integral part of the construction of a building; a truss for construction of the solar collector has the beams triangulated and fastened in a rigid structure which is prefabricated and may include roofing rafters.

ON THE DRAWINGS

AS SHOWN ON THE DRAWINGS

Figure 1:
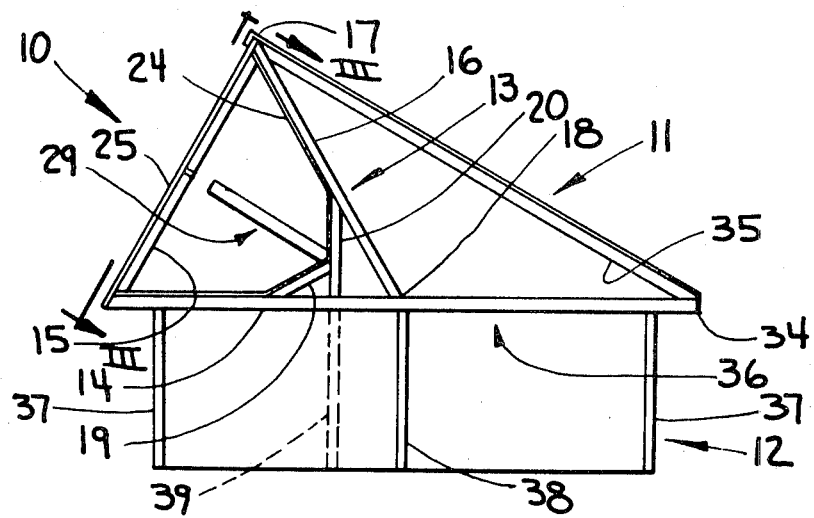
FIG. 1 is a cross sectional view of a solar heat collector and building truss therefor provided in accordance with the principles of the present invention and integrated into a building.

The principles of the present invention are particularly useful when embodied in a solar heat collector of the type illustrated in FIG. 1 and generally indicated by the numeral 10. The solar heat collector 10, herein after referred to as 'collector 10', may be an integral component of a roof, generally indicated by 11, which in turn is an integral component of a building generally indicated by 12.

Figure 2:
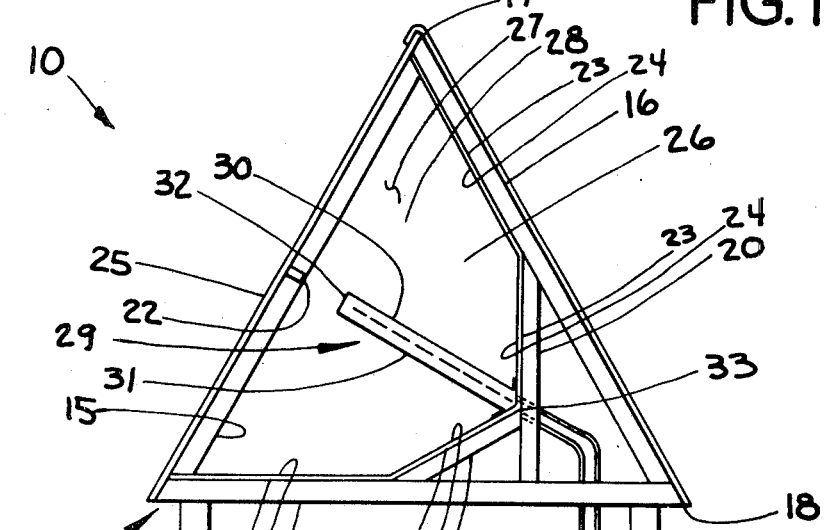
FIG. 2 is detailed cross sectional view of the solar heat collector of FIG. 1.
Figure 5:
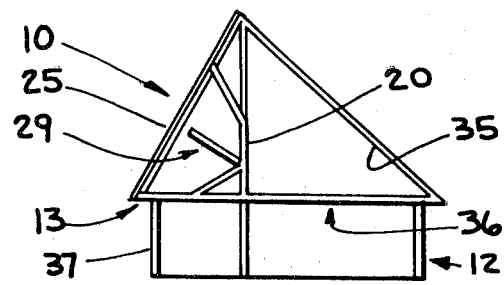
FIG. 5 is a cross sectional view of the solar heat collector of FIG. 1 with an alternative building truss in another alternative form of building.
Figure 6:
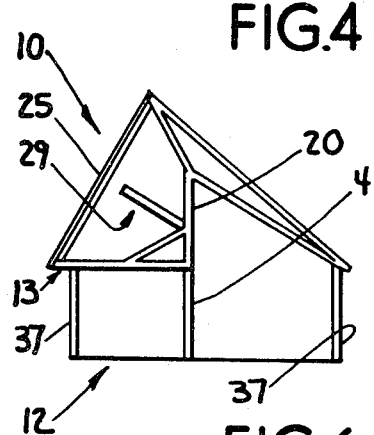
FIG. 6 is a cross sectional view of the solar heat collector of FIG. 1 with the alternative truss as in FIG. 5 in another alternative form of building.
Figure 7:
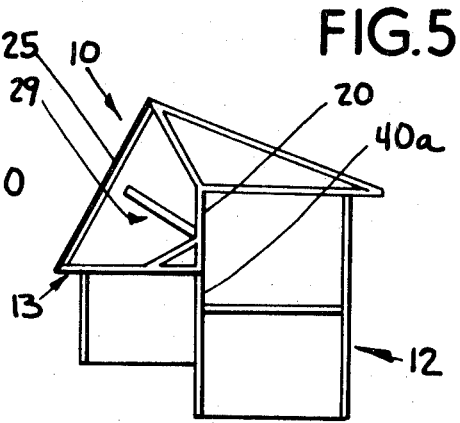
FIG. 7 is a cross sectional view of the solar heat collector of FIG. 1 with the alternative truss of FIG. 5 in another alternative form of building.

The collector 12 per se is shown in greater detail in FIG. 2 and has a plurality of trusses, one of which is generally indicated by 13, and which are one behind the other and approximately two feet on center. The trusses 13 each have a first or base beam 14, a sunward beam 15 extending upward from and above the base beam 14, and a fourth or rear beam 16 jointed to the sunward beam 15 at a top apex 17. The rear beam 16 extends downward and rearward of the sunward beam 15 and is joined to the base beam 14 at a rear apex 18. Within these beams 14, 15, 16 there are a second or lower inclined central beam 19, and a third or upright central beam 20 which truncate the rear apex 18 in the triangular shape formed by the outer beams 14, 15, 16. The second or inclined central beam 19 is connected to the base beam 14 at approximately the mid-point of the base beam 14 and is inclined upwardly to be substantially perpendicular to the rear beam 16. The upright central beam 20 is connected to the approximate mid-point of the rear beam 16 and extends downward to join substantially perpendicular to the base beam 14. This entire truss 13 is preferably a pre-fab truss 13 made in a factory and brought to a construction site in the quantity and size required. For an alternative construction such as shown in FIGS. 5, 6, or 7, the truss 13 may be foreshortened by omitting those parts of the rear beam 16 and base beam 14 which are rearward of the upright central beam 20. In both configurations of truss 13, the inclined central beam 19 is connected to the approximate midpoint of the upright central beam 20. The material used for the beams 14, 15, 16, 19, 20 is conventional wood studing although metals and other structural material could be used. The beams are fastened together with conventional nail plates or the like.

The trusses 13 are tied together by being placed upon and fastened to suitable supports 21. The sunward beams 15 are tied together by a transverse blocking 22 which is positioned at a mid-height along the sunward beam 13 between the base beam 14 and rear beam 16. Flat planar sheathing 23 such as plywood, fiberboard or chip board is secured to the interior surfaces of the beams 14, 16, 19, 20 and this sheathing serves to diagonally brace the second, third, and fourth beams 16, 19, 20 and the trusses 13 and support a reflective surface 24 which is fastened to the sheathing 23 and which conforms to the interior profiles of the beams 14, 16, 19, 20. Examples of the reflective surface 24 may be aluminum or metal foil, metalized thermo plastic film, or foil backed insulation. Another alternative sheathing 23 and reflective surface 24 is foil backed gypsum board. A solar window 25 is mounted to the sunward beams 15 and closes an interior section 26 of the collector 10. The ends of the collector 10 are closed by conventional end walls 27 which are parallel to the trusses 13 and which also have reflective surfaces 28 facing the interior section 26.

A heat absorber 29 is inside of the collector 10 and is mounted to and at least partially supported by the central beams 19, 20. The heat absorber 29 has an upper heat absorber surface 30 facing toward the upper portions $24_d$, $24_c$ of the reflective surfaces 24, a lower heat absorber surface 31 faces downward toward the lower portions $24_b$, $24_a$ of the reflective surface 24, and an outer end 32 which is spaced inwardly of the solar window 25 and the transverse blocking 22 leaving an open air gap there-between. Fluid conduits 33 or alternatively wires extend from the heat absorber 29 to a heat transfer device (not shown) for consuming or storing absorbed solar heat. The heat absorber 29 preferably extends the full length of the collector 10 and abuts against the end walls 27, and therefor extends the entire length between the farthest apart of the trusses 13.

The geometry and shape of the collector 10 is preferably an equilateral triangle formed by the base, sunward and rear beams 14, 15, 16; this is true even if only a part of a triangular shape is utilized as shown in FIGS. 5, 6 and 7 with the rear apex 17 chopped off. The reflective surface 24 is symetrical, as are the supporting beams 14, 16, 19, 20 beneath the reflective surface 24, about a line drawn perpendicularly from the connection point 33 between the central beams 19, 20 to the solar window 25. The included angles between the sunward beam 15, and the base beam 14 and rear beam 16 are identical and preferably 60 degrees. The included angles between the rear and upright beams 16, 20, and the base and inclined beams 14, 19, respectively, are also identical and preferably 150 degrees. The upright and inclined central beams 20, 19, form a symetrical concavity having a preferred included obtuse angle of 120 degrees. The included angle between the base and rear beams 14, 16 is preferably 60 degrees. The heat absorber 29 is on the symetry centerline within the reflective surfaces 24, and is perpendicular to solar window 25. The heat absorber surfaces 30, 31 are parallel to each other and also symetrical about the symetry centerline. The central beams 19, 20 are preferably slightly shorter than that part of the base and rear beams 14, 16 forward of the central beams 19, 20, and the reflective surface on the central beams 19, 20 have a width in the range of 0.6-0.8 of the width of the reflective surfaces on the base and rear beams 14, 16. The joined together base, rear and central beams 14, 16, 19, 20 are as clearly seen in all the FIGS., in the form of one-half of an octagon; specifically they form four of the eight sides normally seen in an octagon.

The collector 10 may be a self-standing structure as shown in FIG. 2 or be integrated into a roof 11 and building 12 as shown in FIG. 1. The base beam 14 may be a ceiling joist and extend rearwardly to a distal end 34. A roof rafter 35 may be joined to the upper apex 17 and the base beam 14. This structure forms a building roof truss 36 having the collector truss 13 as an integral part thereof. The base 14 beam is then set atop exterior building walls 37 and soffits and facia (not shown) are mounted on the cantilevered overhang of the base beam 14. The rear apex 18 may be picked up and supported by an interior wall 38, and the upright central beam 20 picked up and supported by another interior wall 39. The space between the interior walls 38, 39 is ideal for hallways or closets.

Figure 3:
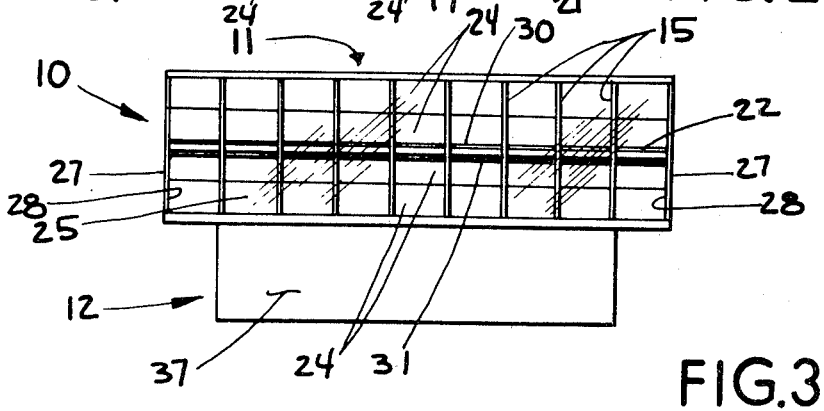
FIG. 3 is a view of the solar heat collector as seen from view lines III—III of FIG. 1.
Figure 4:
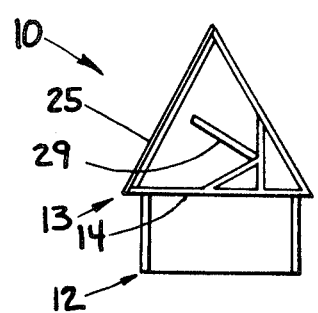
FIG. 4 is a cross sectional view of the solar heat collector of FIG. 1 in an alternative form of building.

FIG. 3 illustrates the collector 10 head-on from where the sun would shine. The transverse blocking 22 traverses all of the sunward beams 15 and ties them together. The collector 10 spans the entire length of the roof, or it could span any portion thereof.

FIGS. 4, 5, 6 and 7 illustrate alternative and currently popular building structures incorporating the collector 10 as an integral part of the construction. The FIG. 4 embodiment is a maximum area configuration wherein the collector truss 13 forms the entire roof truss. FIG. 5 is a configuration of lesser area in the collector 10 and where the upright central beam 20 extends to the roof peak as a bearing member. FIG. 6 illustrates a vaulted ceiling to the rear of the collector 10 with the upright central beam 20 forming part of an interior wall 40 of a building. FIG. 7 illustrates a split-foyer construction wherein the upright central beam 20 also forms a part of an interior wall $40a$. The solar window 25 supported by sunward beams 15 is an exposed and exterior roof surface. The preferred window 25 is plastic sheet formulated specifically for this purpose in widths of four feet and height of 8, 10, 12, 14, or 16 feet as required.

As a specific example, a 20 foot by 40 foot house built in accordance with the cross section shown in FIG. 1 and having two foot soffits and with the interior wall 38 in the center of the house, would use seven 4' by 14' sheets of plastic for the window 25 and have an aperture for passing light into the reflective surfaces 24 and absorber 29 of about 616 square feet which is two-thirds the floor area of the house; and yet the house has an exterior appearance that is conventional. The heat collector can be operative with either flowing air and/or liquid and/or include photo electric devices. The heat absorber surfaces 30, 31 can be sheet metal, fabricated much as forced air heating ducts are presently fabricated. The sunward beams 15 become load bearing beams and support at least part of the weight of the roof rafters 35. The truss 13 is reasonably well triangulated for rigidity and the roof truss 35 is fully triangulated for rigidity.

Figure 8:
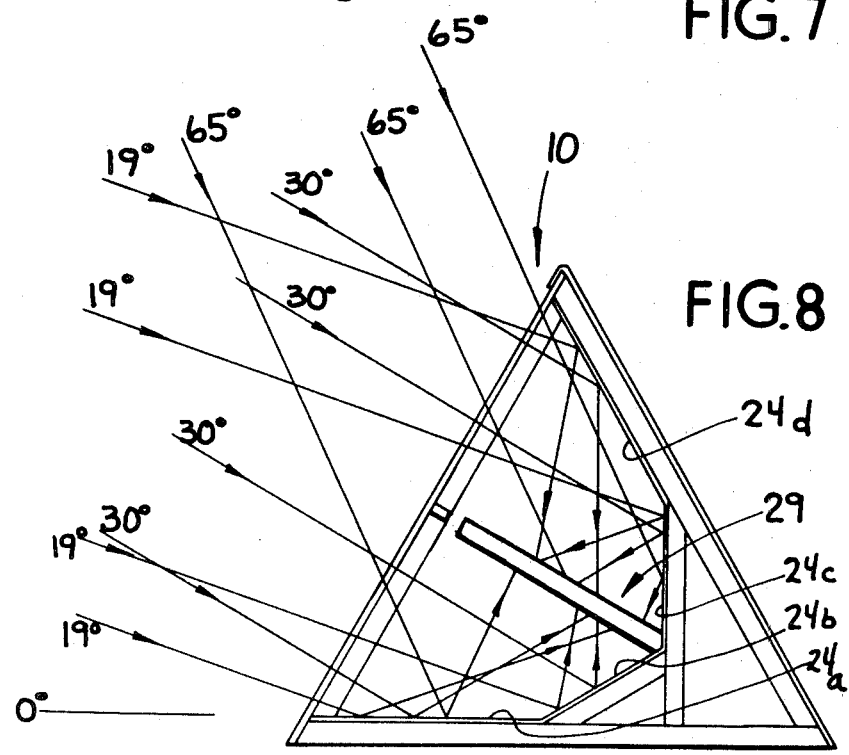
FIG. 8 is a cross sectional view of the solar heat collector of FIG. 1 illustrating angles of radiation from the sun.

Operation of the collector 10 is best shown in FIG. 8. The collector 10 is pointed South, although variances of twenty-five degrees to either East or West are thought tolerable. At a North latitude of 45 degrees, which is approximately Minneapolis-St. Paul, and at high noon, the solar angles of inclination vary from a maximum of 65 degrees in June to a minimum of 19 degrees on December 19th. The average winter inclination is in the range of 20-35 degrees. A 30 degree inclination hits the collector 10 square-on and is the optimal inclination. The solar energy is reflected off of the reflective surfaces 24, and partially concentrated as it is reflected against the heat absorber surfaces 30, 31. By virtue of the concentration, the size of the heat absorber 29 is reduced and therefor the cost is reduced. Various angle of incidence from winter minimum to summer maximum are shown reflecting off all of surfaces 24$_a$, 24$_b$, 24$_c$, 24$_d$ to the heat absorber 29. The heat absorber 29 is reduced in size, but the upper and lower absorber surfaces 30, 31 double the area of the absorber 29 and increase its absorbtion efficiency. The absorber 29 is spaced inward from the window 25 which reduces heat losses to ambiant. The beams 14, 16, 19, 20 are easily insulated with conventional fiberglass batting, and were bracing other than the sheathing 23 to be utilized, foil-backed fiberglass could be used for the reflective surfaces 24. The entire collector 10 is constructed of conventional and well known materials, the construction is simple, the angles are simple, the reflectors are low cost, and the collector 10 has tremendous area for intake of solar energy. Construction of the collector 10 utilizes the same trade skills that craftsmen used for the past several decades and does not require relatively sophisticated newer skills. The collector 10 sacrifices theoretical perfection in order to attain cost effectiveness, i.e. value, and it is esthetically compatable with existing architecture. The relative size of the collector 10 and trusses 13, 35 are made large or small as required for a particular building size. The collector 10 and truss 13 adapt itself to most popular residential building types and is easily integrated therein. The solar window 25 is of very large area, forms an exterior roof surface and saves the cost of a conventional roof under exterior type collectors. The collector 10 is mildly concentrating and the outward length of the heat absorber 29 is about 40 to 45% the height of the solar window but the double absorber surfaces 30, 31 bring the area of the absorber up to about 80 to 90% of the area of the window 25. The collector 10 can also be remotely free standing and still be very cost effective, as shown in FIG. 2.

Although various and minor modifications may be suggested by those versed in the art, it should be understood that I wish to embody within the scope of the patent warranted hereon, all such embodiments as reasonably and properly come within the scope of my contribution to the art.

I claim as my invention:

1. A solar heat collector building truss, comprising:
   (a) a base beam;
   (b) a sunward beam extending upward from and over the base beam;
   (c) a rear beam extending downward from an apex between said rear beam and the sunward beam;
   (d) an upright central beam connected to and extending downward from the rear beam toward the base beam, said upright central beam being substantially perpendicular to the base beam and truncating a projected apex between the rear and base beams; and
   (e) an inclined central beam spaced rearward of said sunward beam between the upright central beam and the base beam said central beams forming between themselves an obtuse angle with the concave surfaces of the obtuse angle facing the sunward beam.

2. A solar heat collector building truss according to claim 1 in which the truss is mounted parallel to and spaced from a plurality of like trusses, said plurality of like trusses being structurally connected to each other by transverse blocking in-between and joined to each of the sunward beams, said transverse blocking being positioned substantially at a midway height of the sunward beam.

3. A solar heat collector building truss according to claim 1, in which the base beam extends rearward of the said projected apex, and in which a roof rafter beam connects an apex between the sunward beam and the rear beam to a rear distal end of the base beam.

4. A solar heat collector building truss according to claim 1, in which the base, rear and central beams define an interior edge facing the sunward beam, which edge is substantially symetrical about a line projected perpendicularly from the sunward beam to the intersection between the central beams.

5. A solar heat collector building truss comprising:
   (a) a base beam;
   (b) a sunward beam extending upward from and over the base beam;
   (c) a rear beam extending downward from a top apex between said rear beam and the sunward beam, said rear beam being joined to the base beam at a rear apex, said beams forming a closed triangular shape; and
   (d) central beams extending between and fastened to the base and rear beam and truncating the triangular shape frontward of the rear apex, said central beams comprising:
      (1) an upright beam extending from the approximate mid-point of the rear beam to the base beam, and
      (2) an inclined beam extending from the approximate mid-point of the base beam to the approximate mid-point of the upright beam.

6. A solar heat collector building truss according to any of claim 5 in which said base beam is a ceiling joist extending rearward beyond the rear apex.

7. A solar heat collector building truss according to claim 5, including a roof rafter extending downwardly from the top apex to the ceiling joist, said rafter being joined to the ceiling joist substantially rearward of the rear apex.

8. A solar heat collector building truss according to claim 5, in which said upright central beam is perpendicular to the base beam, and in which said inclined beam is perpendicular to said rear beam.

* * * * *